April 6, 1937.  O. M. BABCOCK  2,075,795
METHOD AND APPARATUS FOR MAKING WALLS OF SHIPPING CONTAINERS
Filed May 15, 1931  14 Sheets-Sheet 2

Witness:
Chas. R. Koursh

Inventor,
Oliver M. Babcock
by Wallace R. Lane, Atty.

April 6, 1937. O. M. BABCOCK 2,075,795
METHOD AND APPARATUS FOR MAKING WALLS OF SHIPPING CONTAINERS
Filed May 15, 1931 14 Sheets-Sheet 3
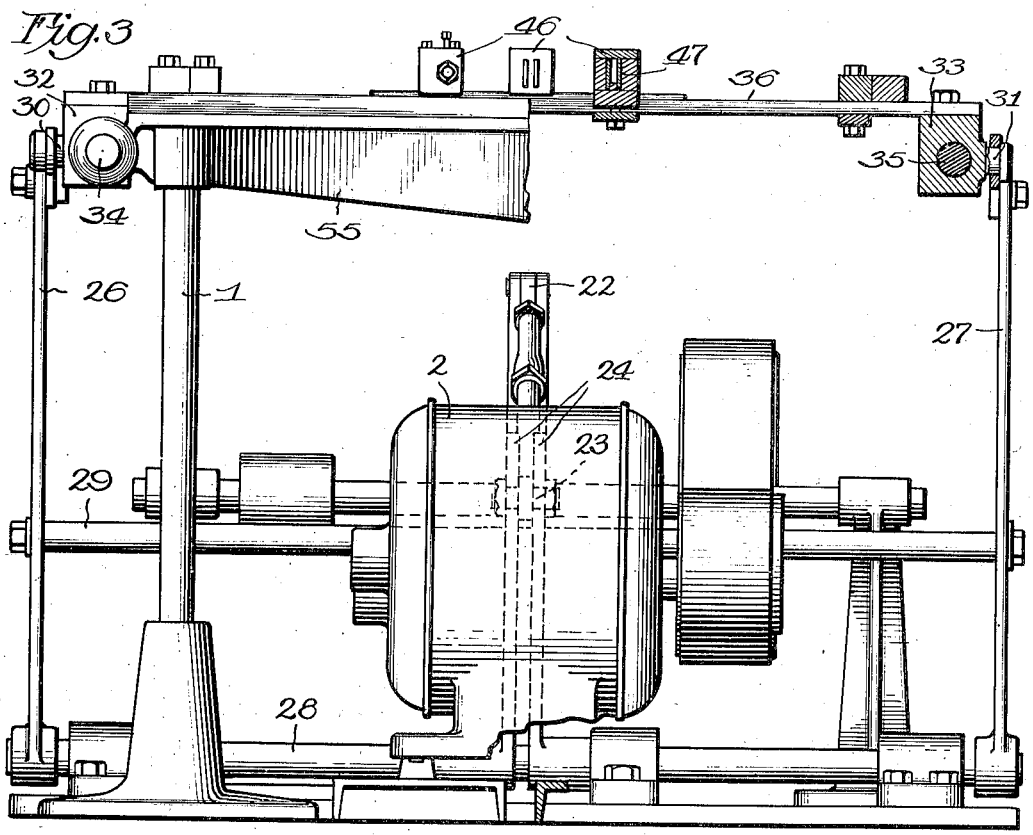
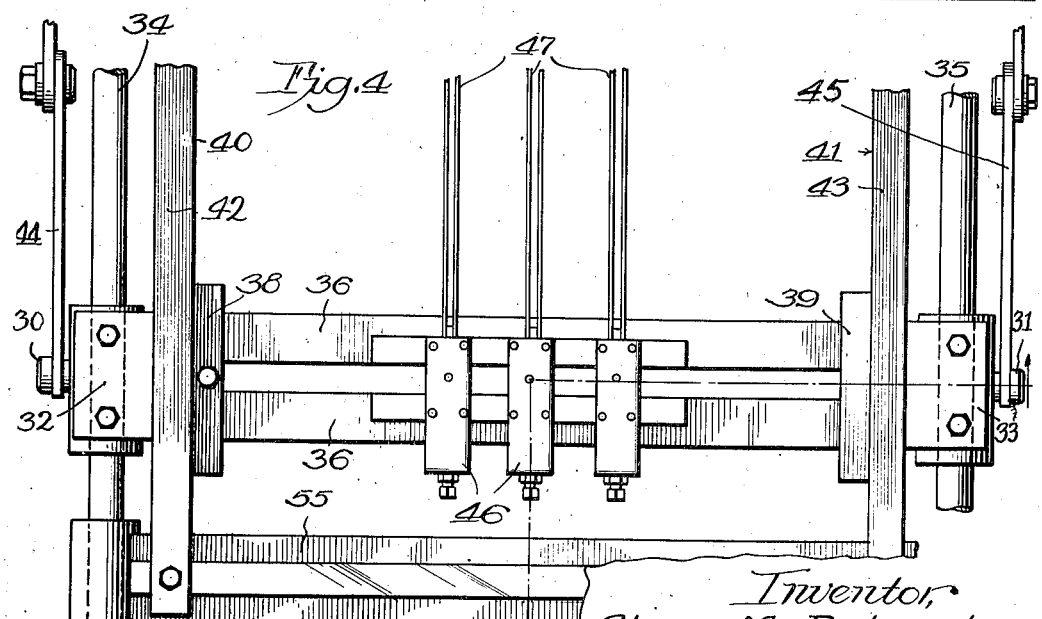
Inventor,
Oliver M. Babcock
by Wallace R. Lane, Atty.

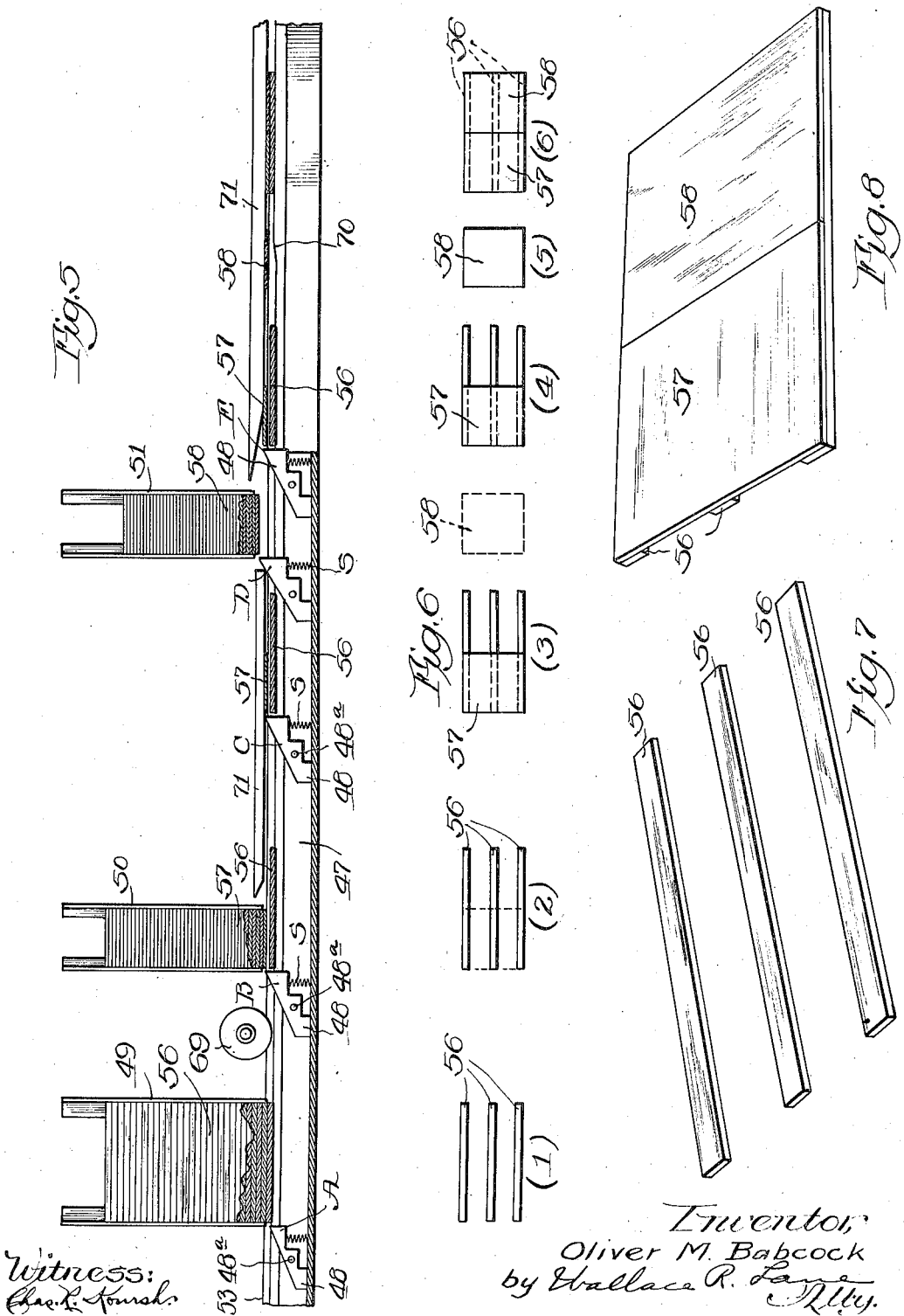

April 6, 1937. O. M. BABCOCK 2,075,795
METHOD AND APPARATUS FOR MAKING WALLS OF SHIPPING CONTAINERS
Filed May 15, 1931 14 Sheets-Sheet 5
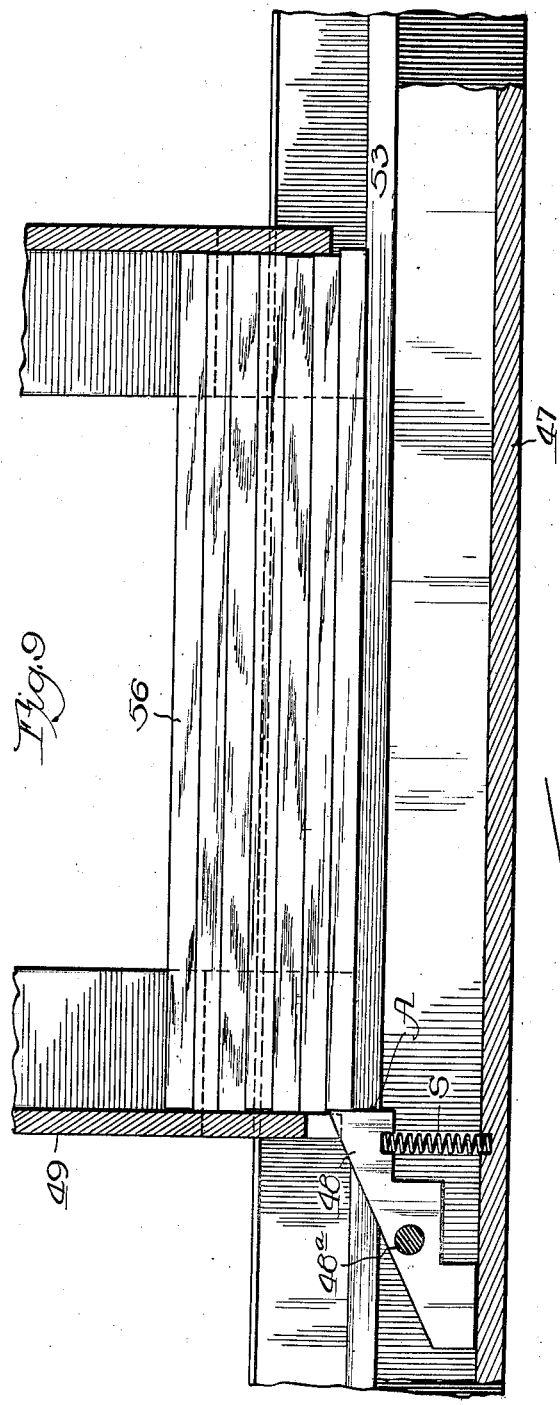
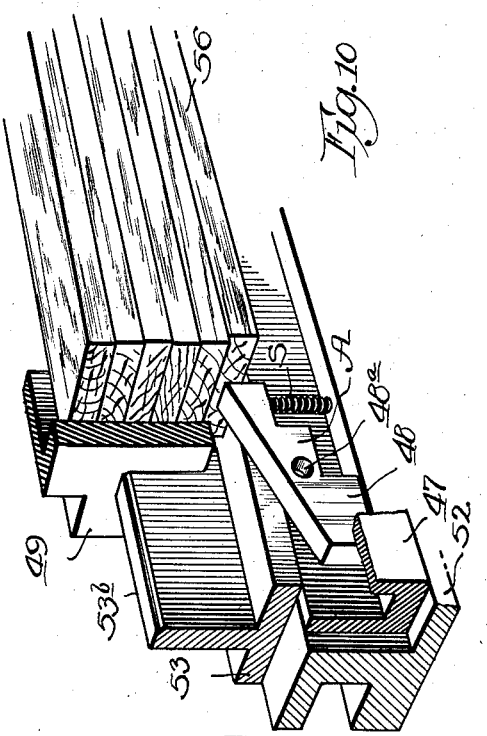
Inventor
Oliver M. Babcock
by Wallace R. Lane Atty.

April 6, 1937. O. M. BABCOCK 2,075,795
METHOD AND APPARATUS FOR MAKING WALLS OF SHIPPING CONTAINERS
Filed May 15, 1931 14 Sheets-Sheet 6
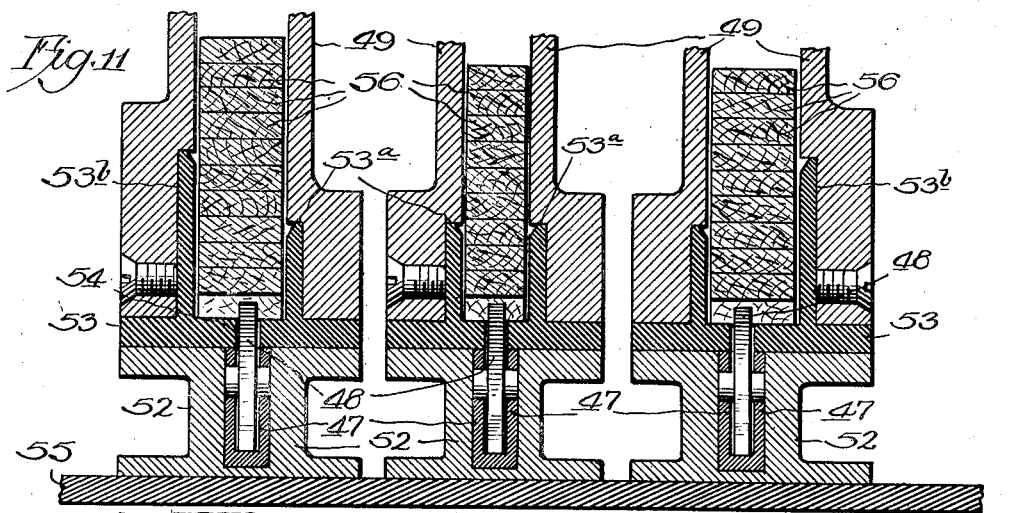
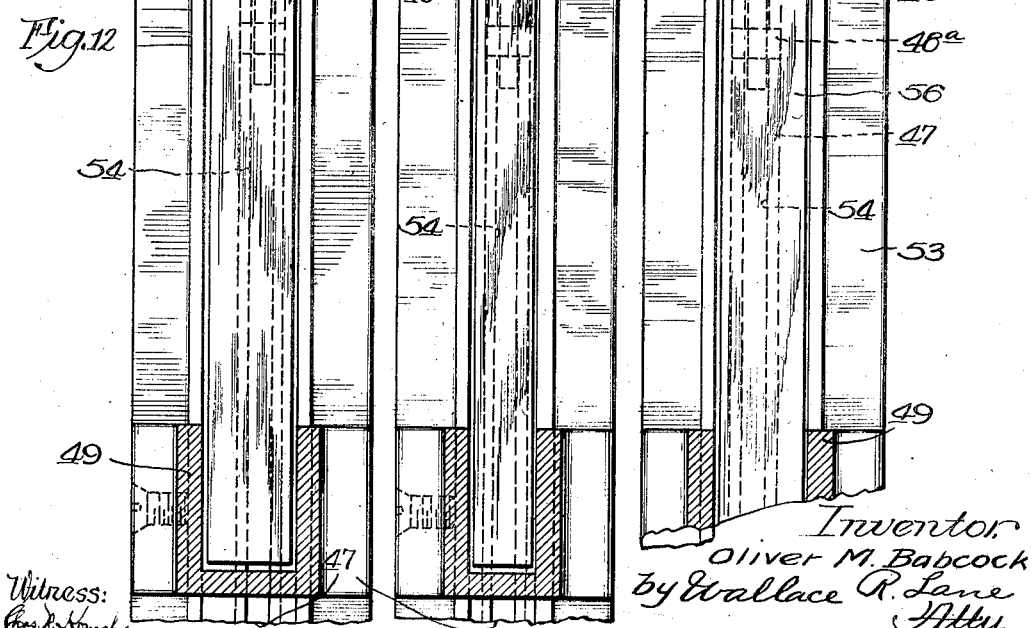
Inventor
Oliver M. Babcock
by Wallace R. Lane
Atty.

April 6, 1937.  O. M. BABCOCK  2,075,795
METHOD AND APPARATUS FOR MAKING WALLS OF SHIPPING CONTAINERS
Filed May 15, 1931  14 Sheets-Sheet 7
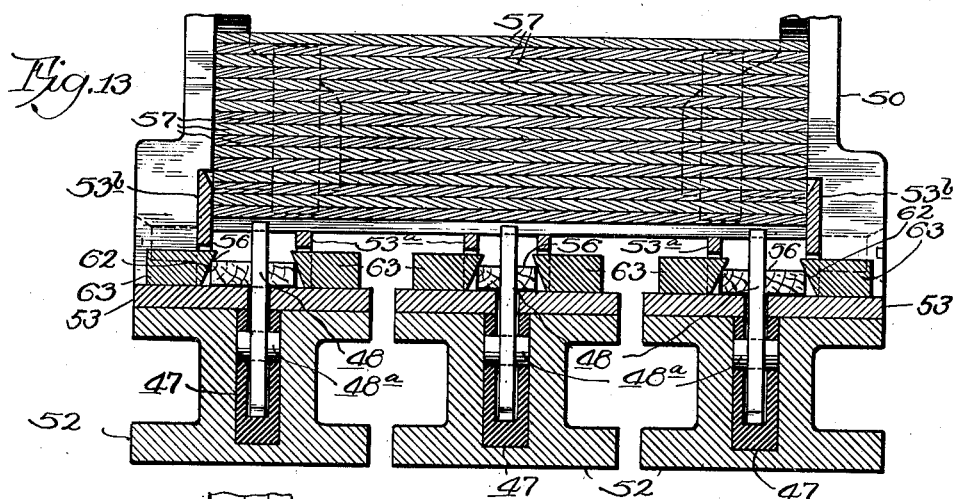
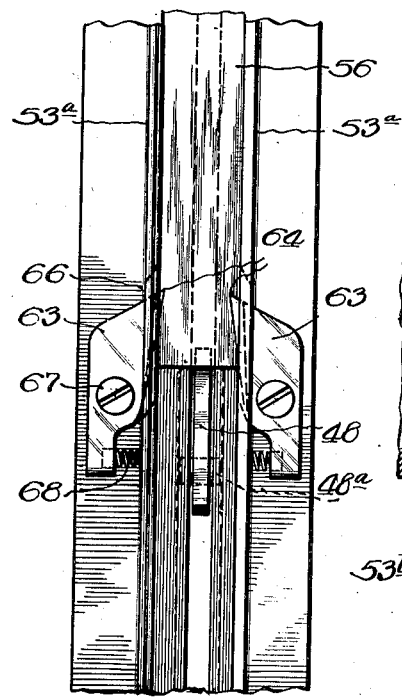
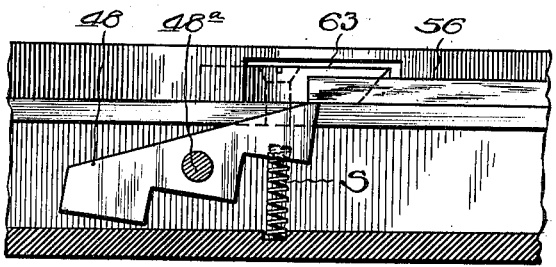
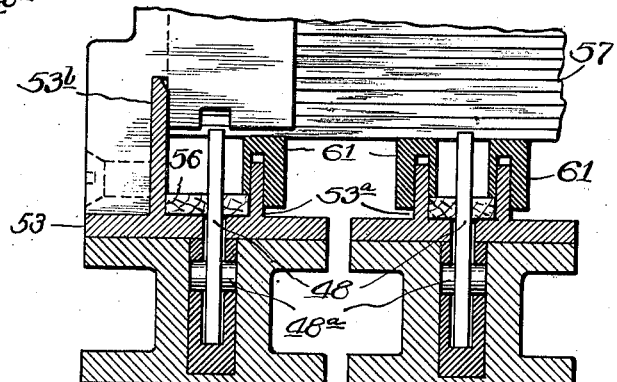
Inventor,
Oliver M. Babcock
by Wallace R. Lane
Atty.

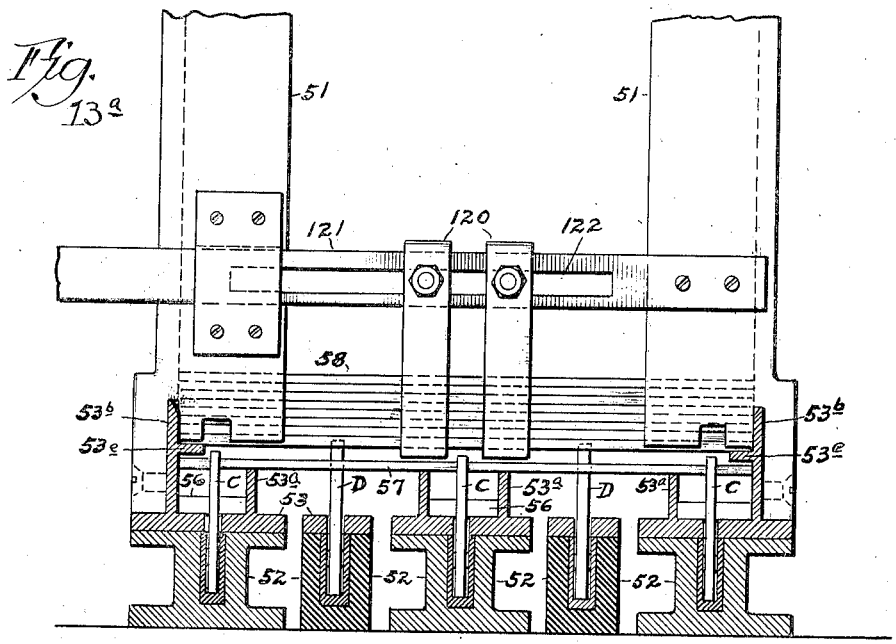
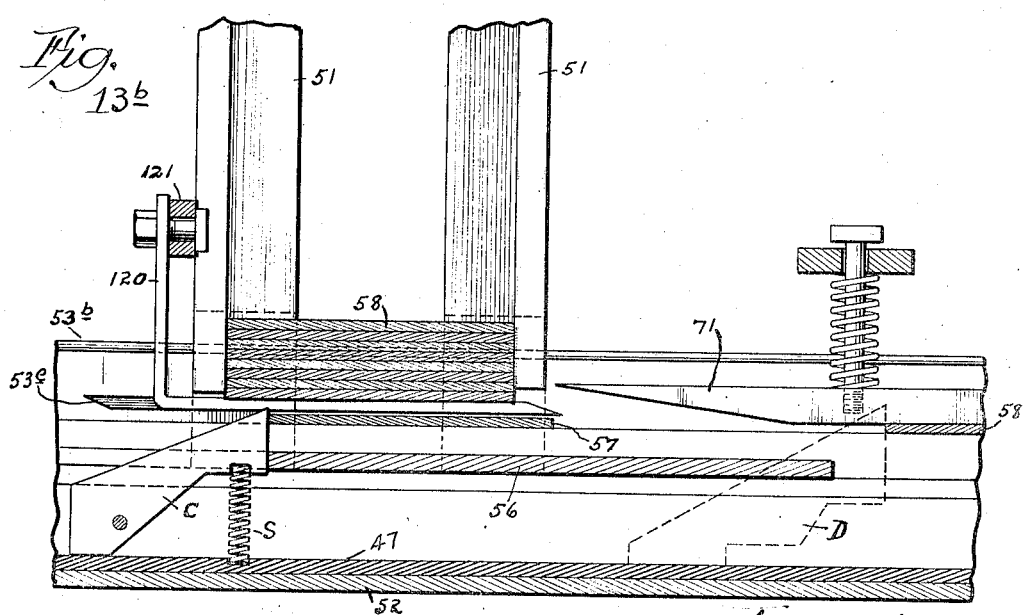

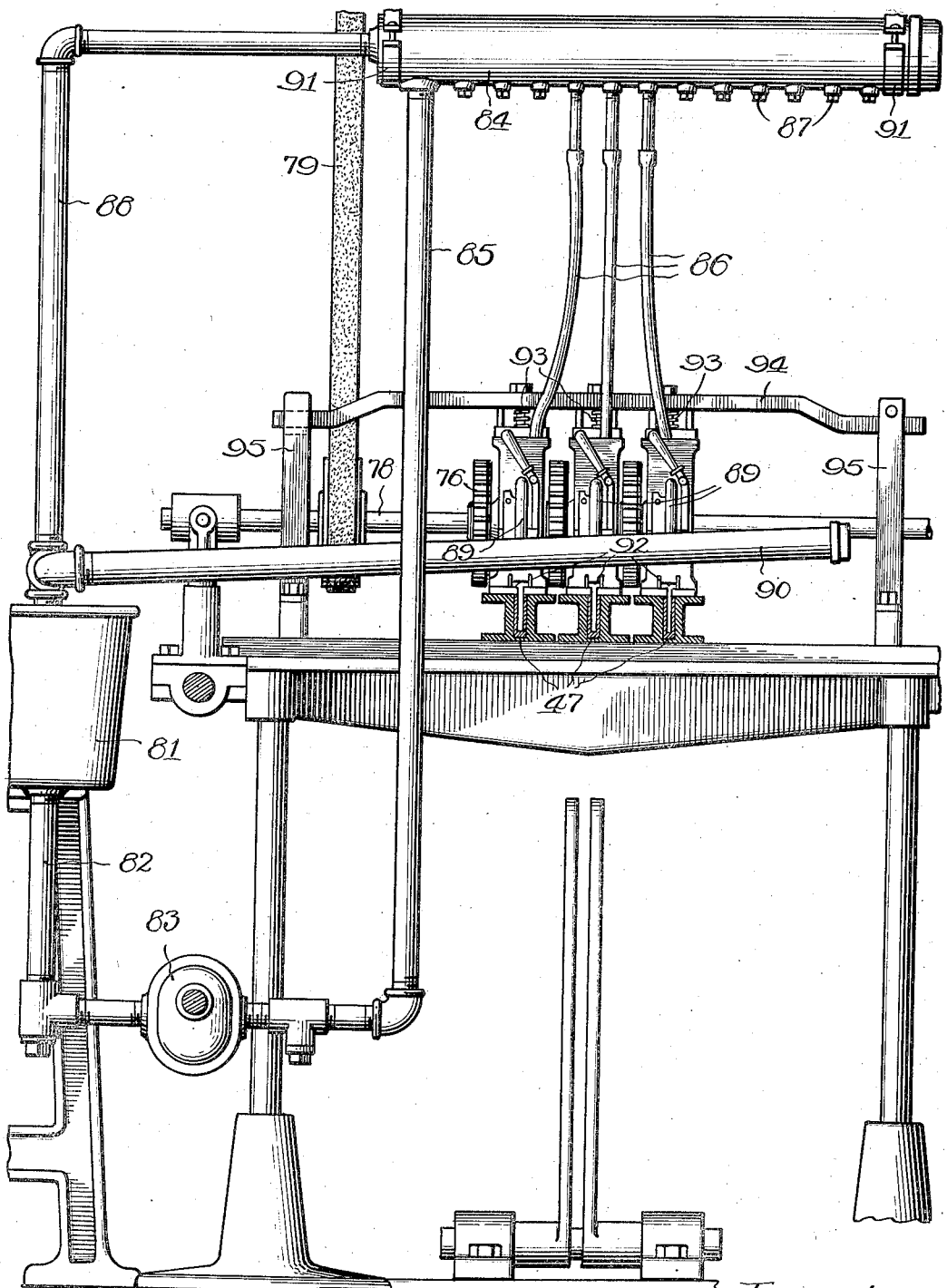

April 6, 1937.　　　O. M. BABCOCK　　　2,075,795
METHOD AND APPARATUS FOR MAKING WALLS OF SHIPPING CONTAINERS
Filed May 15, 1931　　　14 Sheets-Sheet 10
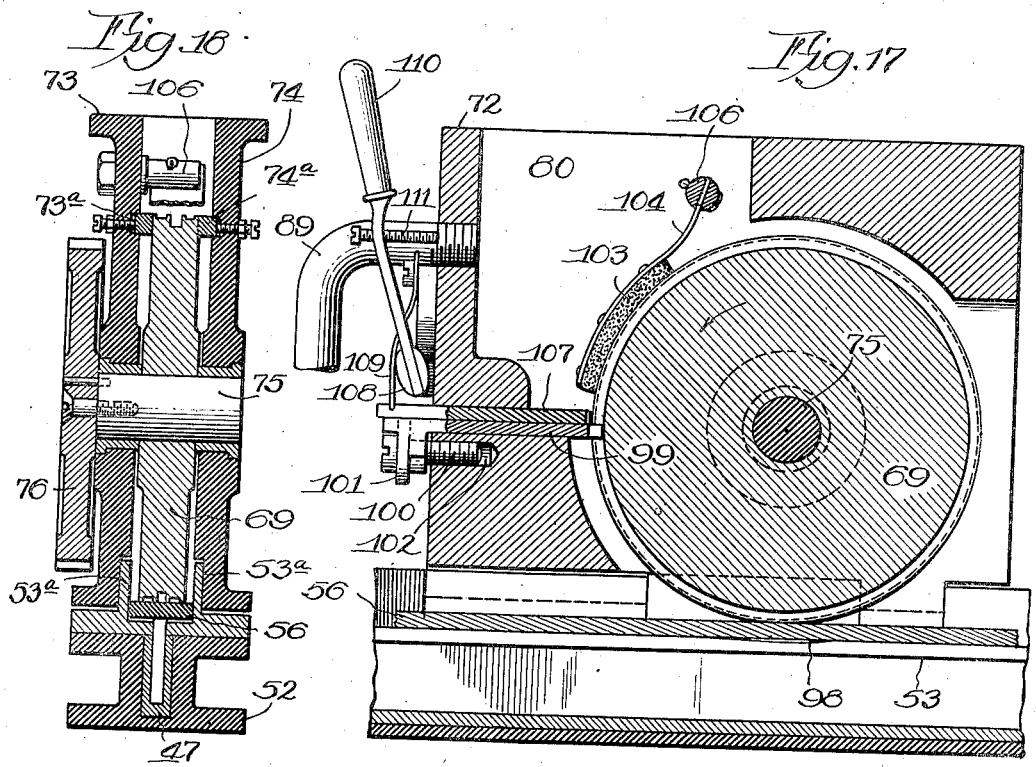
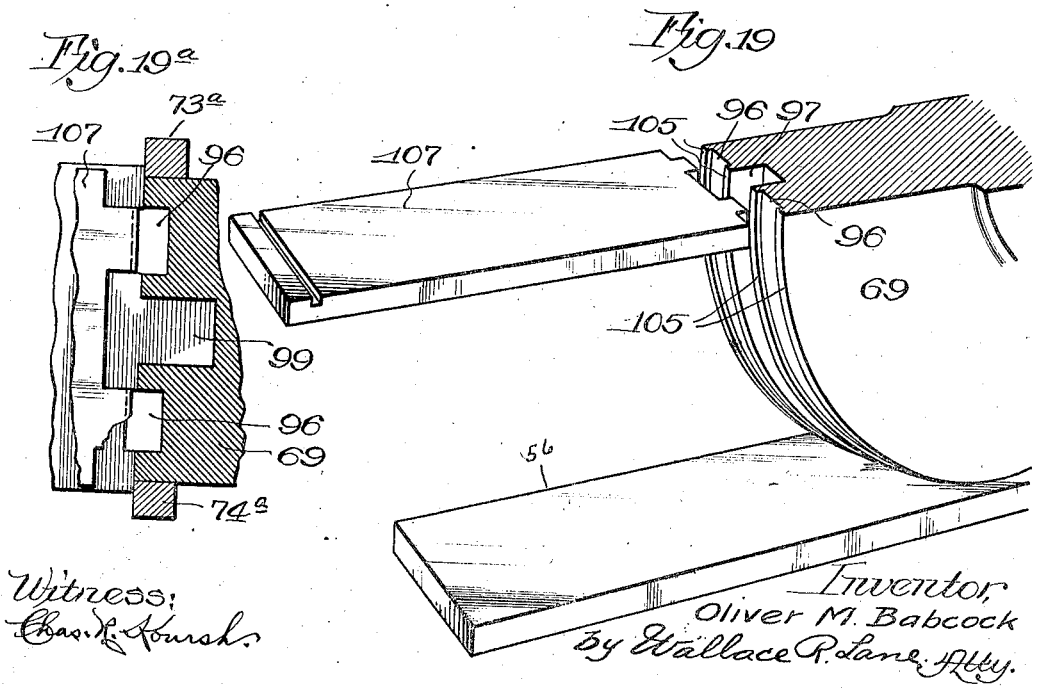
Witness:
Chas. L. Koursh.
Inventor,
Oliver M. Babcock
By Wallace R. Lane, Atty.

April 6, 1937. O. M. BABCOCK 2,075,795
METHOD AND APPARATUS FOR MAKING WALLS OF SHIPPING CONTAINERS
Filed May 15, 1931 14 Sheets-Sheet 11
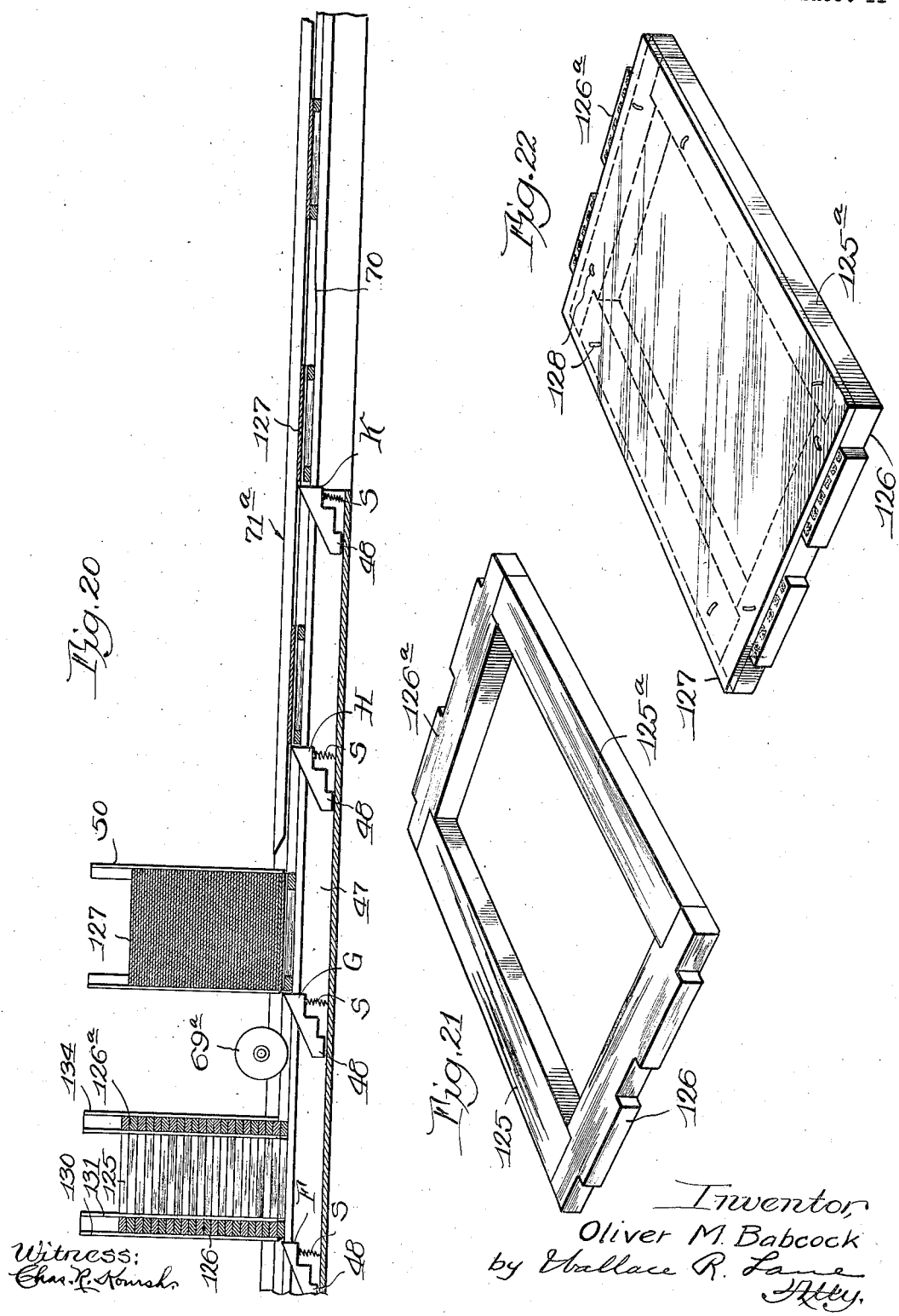

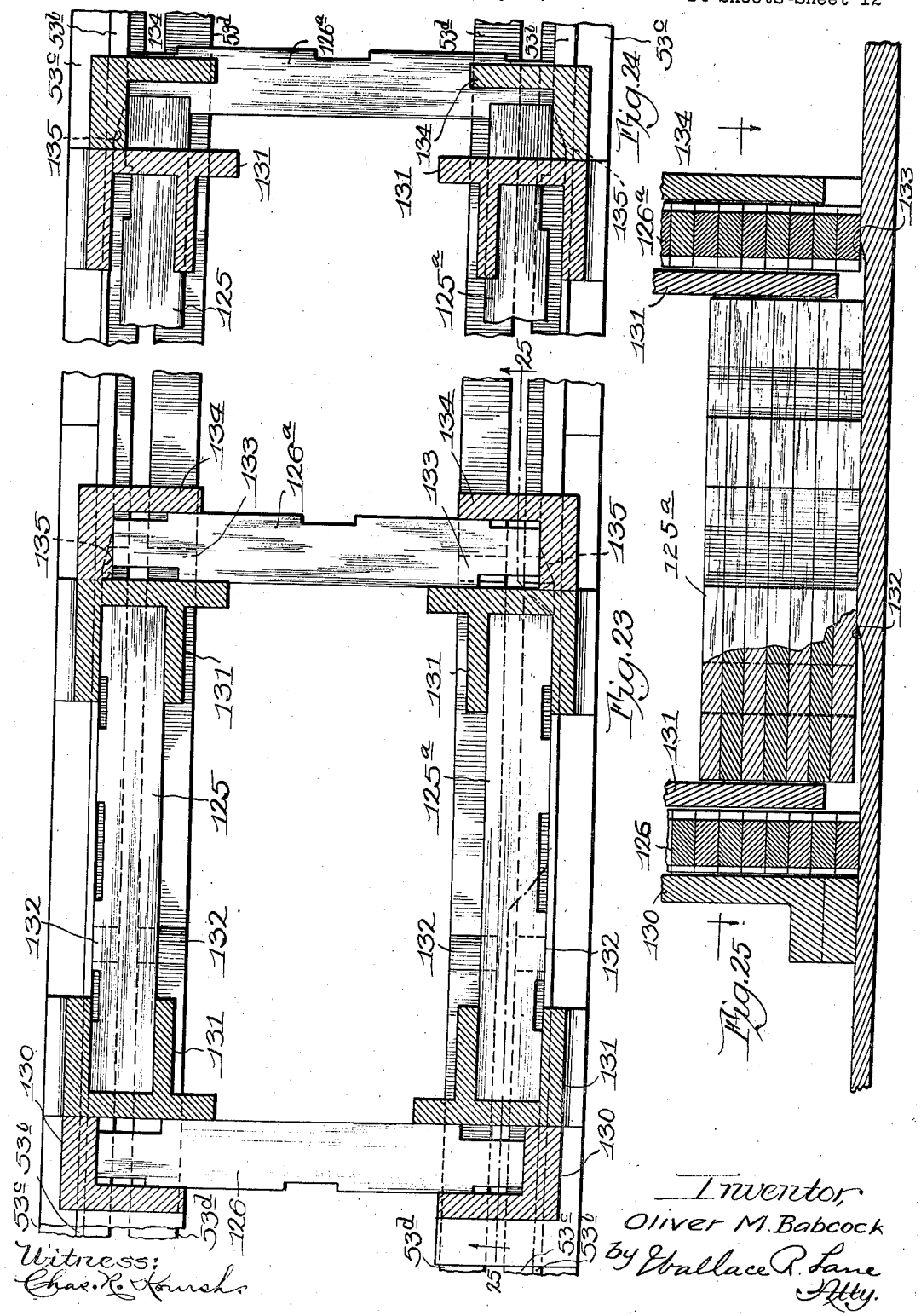

April 6, 1937.  O. M. BABCOCK  2,075,795
METHOD AND APPARATUS FOR MAKING WALLS OF SHIPPING CONTAINERS
Filed May 15, 1931  14 Sheets-Sheet 13
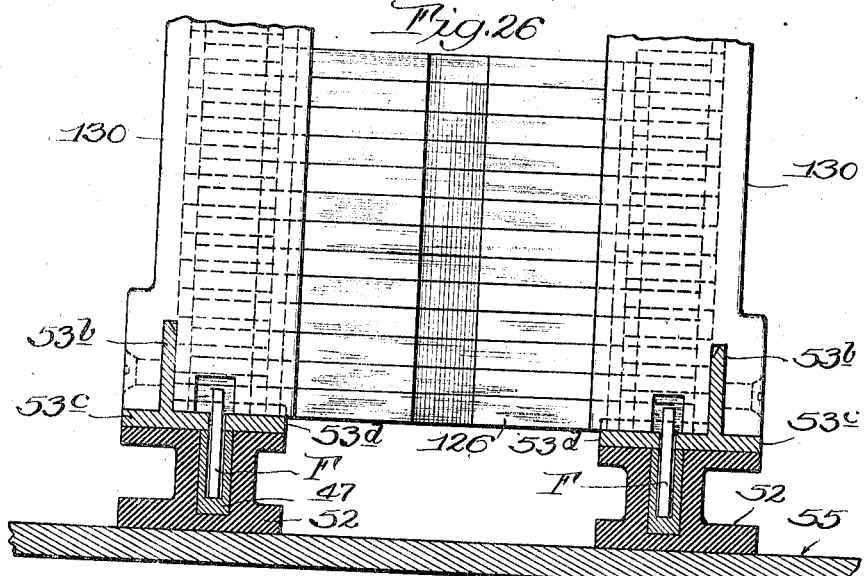
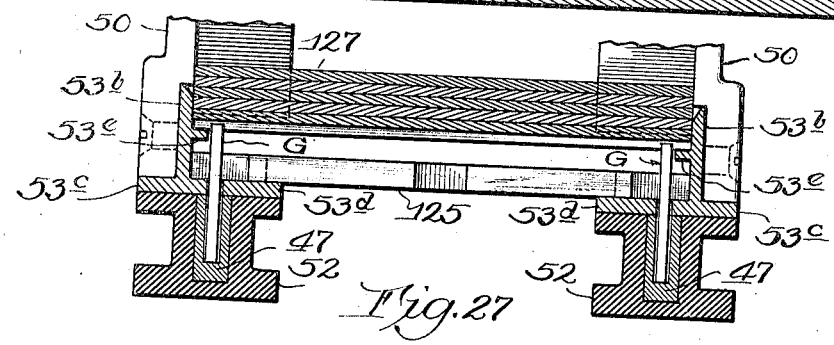
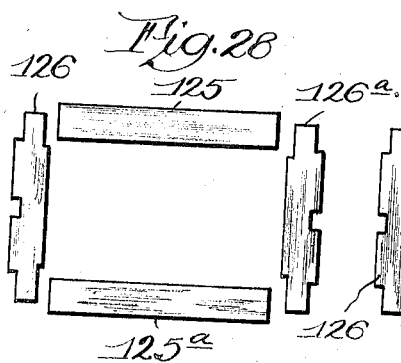
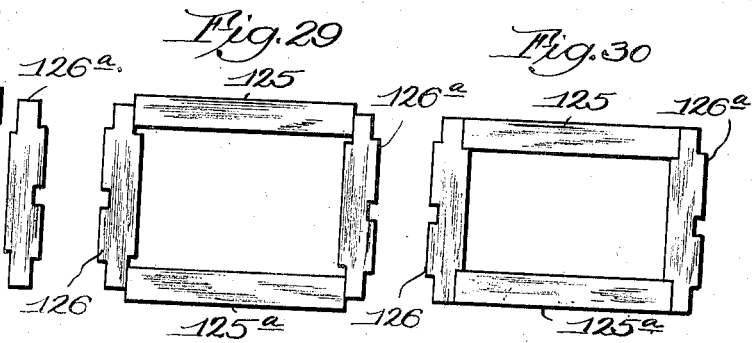
Inventor,
Oliver M. Babcock
by Wallace R. Lane
Atty.
Witness:
Chas. R. Kornsh April 6, 1937.  O. M. BABCOCK  2,075,795
METHOD AND APPARATUS FOR MAKING WALLS OF SHIPPING CONTAINERS
Filed May 15, 1931   14 Sheets-Sheet 14
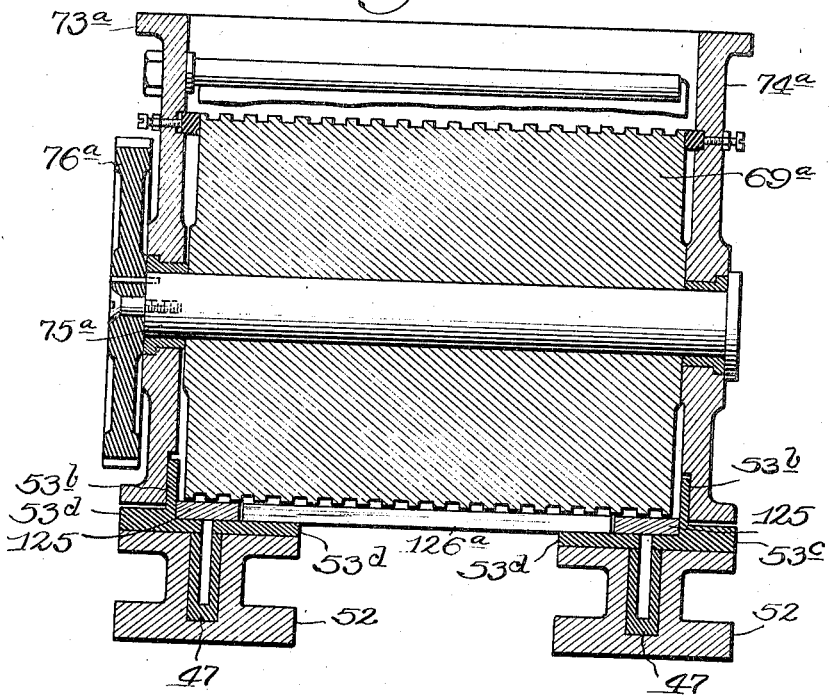
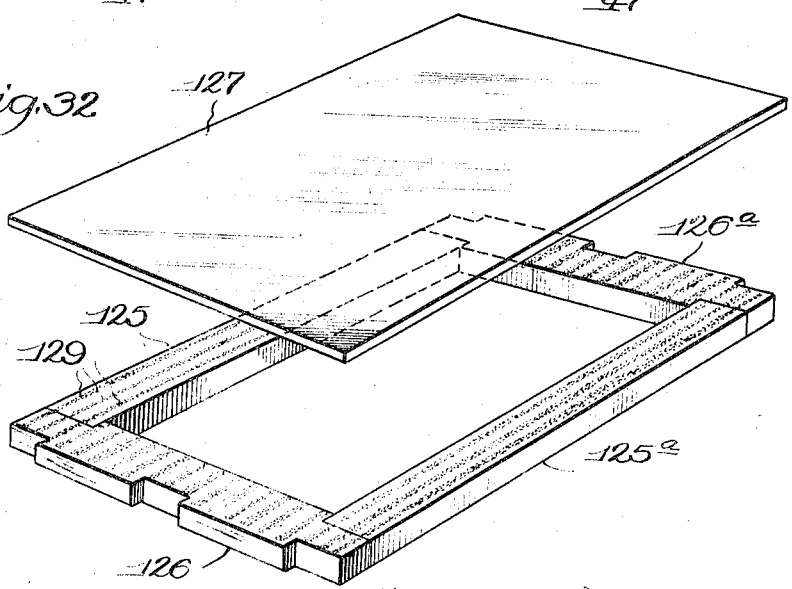
Inventor,
Oliver M. Babcock Patented Apr. 6, 1937

2,075,795

UNITED STATES PATENT OFFICE 2,075,795

METHOD AND APPARATUS FOR MAKING WALLS OF SHIPPING CONTAINERS

Oliver M. Babcock, Evanston, Ill.

Application May 15, 1931, Serial No. 537,648

24 Claims. (Cl. 1—8.1)

This invention relates to the method of and apparatus for making the walls of shipping containers, and shipping container walls made thereby, and more particularly to shipping container walls which are made up of sheet material and reinforcing strips, cleats, or the like, and the making of said walls.

Among the objects of my invention is to provide for the quick and efficient assembly of elements to form shipping container walls.

A further object is to produce a wall of a shipping container, of strips, cleats, or the like, and sheets assembled together in a predetermined relation and fastening the same together.

Another object is to provide a shipping container wall made up of parts comprising sheets and strips, cleats, or the like, applying an adhesive to one or more of said parts, and then pressing said parts together.

A still further object is the provision of a method and apparatus for applying reinforcing strips, cleats, or the like, to sheet material in a more facile and efficient manner.

A further object is the provision of novel means for feeding strips, cleats, or the like, from hoppers, applying sheets thereto, and assembling the same into a shipping container wall, and securing said parts together with or without an adhesive.

An additional object is to provide means for applying adhesive between the strips, cleats, or the like, and sheets.

Another object is to provide novel means for propelling and guiding strips, cleats, or the like, and sheet material in a predetermined relation to each other, and forming shipping container walls therefrom.

A further object is the holding apart of the sheets from the strips, cleats, or the like, after the adhesive has been applied to the strips, cleats, or sheets, until a predetermined time, and then firmly bringing and holding them together.

A still further object is the assembling of strips or cleats in predetermined relation and applying one or more sheets thereto with or without an adhesive therebetween.

A further object is the provision of a novel method and means for assembling cleats from hoppers to form panels and bringing them together in their proper relation to each other and applying thereto sheet material with or without an adhesive therebetween.

Another object is the provision of novel method and means for assembling cleats from hoppers to form panels and bring them together in their proper relation.

A further object is the provision of a novel shipping container wall made by the method and with the apparatus described herein.

Other objects, advantages and capabilities will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:—

Fig. 3 is an elevation, partly broken away and partly in section, of the end of the machine opposite to that shown in Fig. 2.

Fig. 4 is a fragmentary plan view of the end of the machine shown in Fig. 3, and showing the cross-head and the adjacent ends of the trigger bars.

Fig. 5 is a more or less diagrammatic view representing a vertical longitudinal section through the strip and sheet hoppers and the mechanism for advancing the strips and sheets forward.

Fig. 6 is a diagrammatic view showing the progression forward of the strips and sheets during the assembling operation.

Fig. 7 is a perspective view of three strips in their assembled relation after being pushed from the strip hopper, but prior to having the sheets positioned thereover.

Fig. 8 is a perspective view of the same three strips after two sheets have been positioned thereon.

Fig. 9 is a vertical longitudinal section through the lower portion of a strip hopper and trigger bar, and showing the associated trigger in position for pushing the lowermost strip longitudinally from the hopper.

Fig. 10 is a perspective view, partly in section, showing the relative positions of the strips in a strip hopper and the associated trigger for propelling the strips.

Fig. 11 is a vertical transverse section through the three strip hoppers and through the fulcrums of the triggers, showing the triggers each in engagement with a strip for propelling it longitudinally from the hopper.

Fig. 12 is a horizontal section through the three strip hoppers, the bottom strip in each of the hoppers being shown as propelled the greater part of the way from the hopper by the triggers, a portion of the right hand hopper being broken away for the conservation of space.

Fig. 13 is a vertical transverse section through the first sheet hopper showing the triggers pushing the bottom sheet from the hopper and at same time pushing the reinforcing strips in the guideways under the sheet material, and also showing the action of the stop pawls to hold down the strips in the guideways.

Fig. 13a is a vertical cross-section through the trigger bars and guideways looking toward the second sheet material hopper and pictures how auxiliary triggers function to propel the bottom sheet out of the second sheet material hopper.

Fig. 13b is a fragmentary vertical longitudinal section through one of the center trigger bars and a portion of the second sheet material hopper, showing the means of propelling the strip and one portion of the sheet material under the second sheet material hopper.

Fig. 14 is a detail plan view showing how the stop pawls prevent the strips from backward movements when the triggers are moved rearwardly thereunder.

Fig. 15 is a sectional detail showing a trigger about to emerge from underneath a strip during backward movement of the trigger.

Fig. 15a is a vertical transverse section through the trigger bars and guideways looking toward the first sheet hopper, and discloses how the strips are held down in the guideways by pressure bars.

Fig. 16 is a transverse vertical section through the machine taken near and looking toward the glue circulating means and the glue rolls.

Fig. 17 is a vertical longitudinal section through one of the glue applying devices.

Fig. 18 is a vertical transverse section through a glue applying device.

Fig. 19 is a fragmentary perspective detail view of a portion of the glue roll.

Fig. 19a is a partial cross-section through a glue spreading roller showing the relative positions of the scraper plates which determine the amount of glue carried by the roller.

Fig. 20 is a view similar to Fig. 5, but showing the machine slightly modified to make box panels comprising a rectangular frame made up of four cleats to which is attached sheet material.

Fig. 21 is a perspective view of a preferred form of box panel frame before the sheet material is applied thereto.

Fig. 22 is a view similar to Fig. 21, but showing the box panel complete with the sheet material attached to the frame.

Fig. 23 is a horizontal sectional view through the left hand hopper of Fig. 20, from which hopper are fed the cleats for forming the box panel frame.

Fig. 24 is a fragmentary horizontal section through one end of the hopper of Fig. 23, but showing the cleats as having been moved a short distance longitudinally of the hopper, with one end of each of the side cleats moved inwardly into assembled relation with the adjacent end cleat.

Fig. 25 is a fragmentary vertical longitudinal section through the lower portion of the hopper of Fig. 23.

Fig. 26 is a view looking toward the cleat panel hopper with the trigger bar, trigger bar guideway and stock guideway in section and showing the triggers in position for pushing the bottom cleats from the hopper.

Fig. 27 is a vertical transverse section through the bottom portion of the box panel sheet hopper, the cleat frame shown as being pushed underneath this hopper to receive on its upper face the sheet material when pushed from the hopper.

Fig. 28 is a diagrammatic plan view showing the relative position of the four cleats when in the hopper of Fig. 23, and prior to being pushed therefrom.

Fig. 29 is a view similar to Fig. 28, but showing the cleats after they have been pushed part way from the hopper, but prior to the side cleats being forced laterally into fitting engagements with the end cleats.

Fig. 30 is a view similar to Fig. 29, but after the side cleats have been forced laterally into fitting engagement with the end cleats.

Fig. 31 is a vertical transverse section through a plane passing centrally through the glue roll used for applying strips of glue between the cleat frame and the sheet material of the box panels.

Fig. 32 is a perspective view of the cleat frame and a layer of sheet material spaced therefrom, and showing the spaced strips of glue on one face of the frame just prior to having the sheet material pressed thereagainst.

Figure 2:
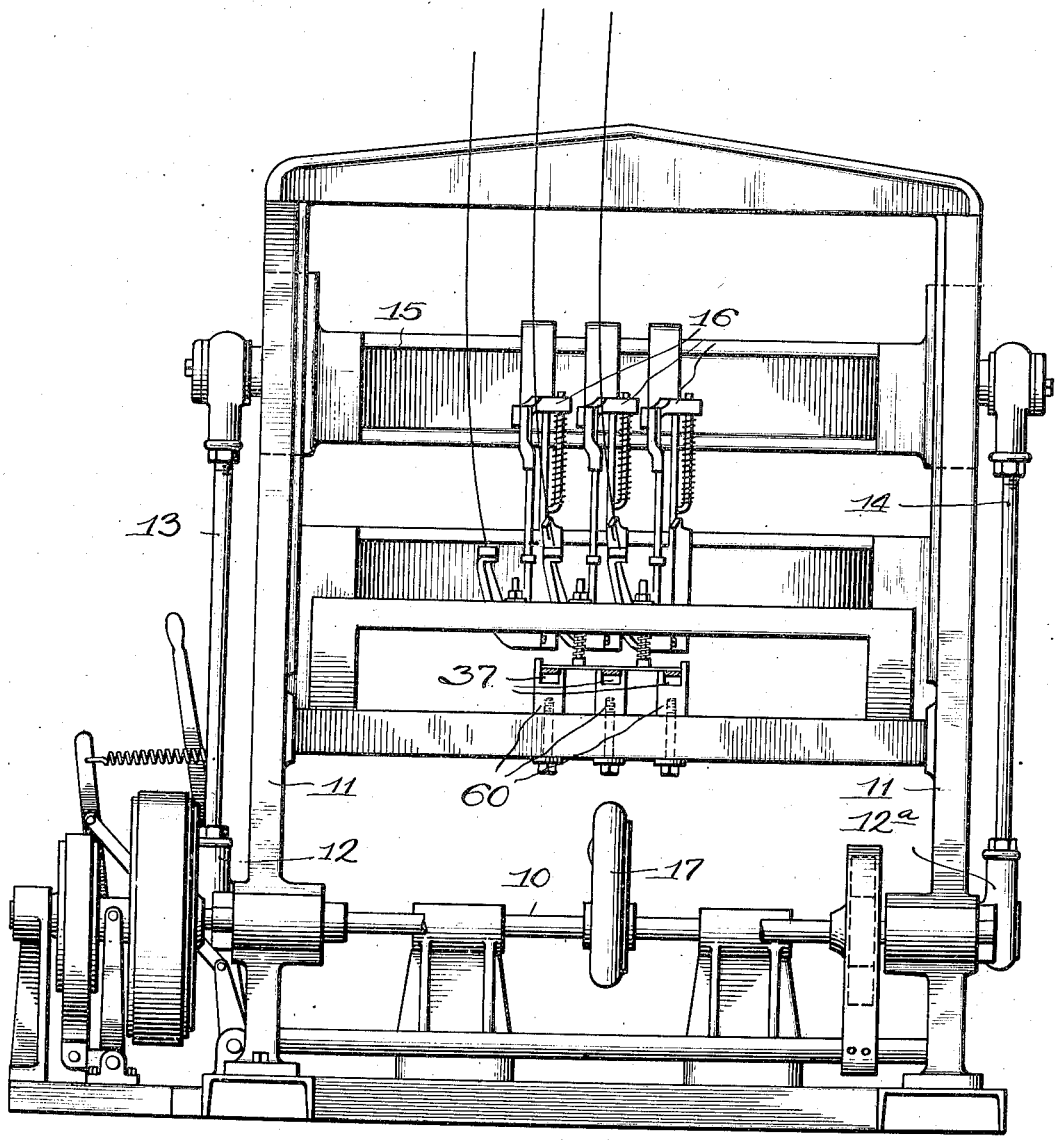
Fig. 2 is an elevation of the delivery end of a machine embodying my invention.

Referring in detail to the drawings, my improved machine comprises a suitable frame 1 in which is mounted the electric motor 2, or other suitable source of motive power, which through the medium of belts and pulleys 3, 4, 5, 6 and 7, or other desired power transmission means, transmits power to the clutch pulley 8 on shaft 9, which shaft through suitable gearing drives shaft 10 which, as shown in Fig. 2, carries, on each side of the upright frame members 11, eccentrics 12—12a, which in turn, through the medium of connecting rods 13—14, cause vertical reciprocation of cross-beam 15. With each revolution of shaft 10 cross beam 15 moves up and down and carries with it the moving parts of stapling mechanisms 16 supported thereon. In Fig. 2 three such stapling mechanisms are shown, but any other number desired may be used. These staplers form and drive staples through the sheets and strips or cleats in a well known manner.

Figure 1:
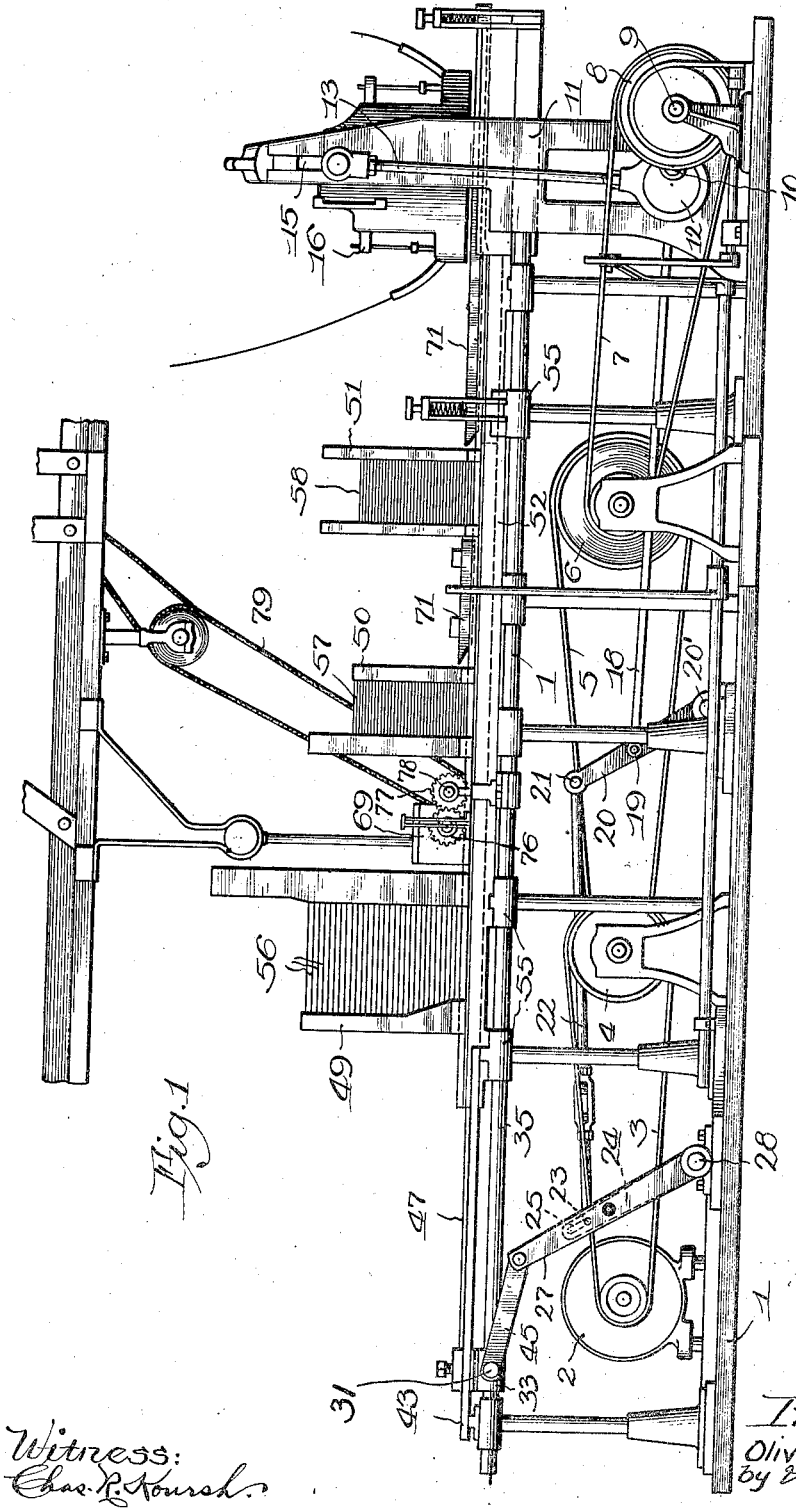
Fig. 1 is a side elevation of a machine embodying the present invention.

Also located upon and operated by shaft 10 is eccentric 17 (see Fig. 2), which operates connecting rod 18 (see Fig. 1) pivoted at 19 to an intermediate rocker arm 20, which is fulcrumed at 20' in a suitable bearing carried by the frame 1, or otherwise as desired. Pivotally connected at 21 to rocker arm 20 is connecting rod 22, which at its opposite end is pivotally connected at 23 to rocker arm 24. Rocker arm 24 is formed with an elongated slot 25, in which pivotal member 23 is adjustably mounted in order that the throw of rocker arm 24 may be increased or decreased as desired.

Rocker arms 26 and 27 (see Fig. 3) are each at their lower ends mounted on shaft 28 mounted in suitable bearings in journals carried by the frame, or otherwise as desired, to enable a rocking movement of said rocking arms 26 and 27, which latter are each at a point intermediate of their length secured to the respective ends of the transversely extending rod 29. The rod 29 is suitably fixed to rocker arm 24 by being passed therethrough, or otherwise secured thereto, as desired, so that the oscillating movement of rocker arm 24 is transmitted through rod 29 to rocker arms 26 and 27, which at their upper ends (see Figs. 3 and 4) are pivotally connected by means of links 44 and 45, respectively, to the pivotal bearings 30 and 31 of crossheads 32 and 33, which in turn reciprocate on rods 34 and 35, respectively, which latter form part of the frame 1.

Crossheads 32 and 33 are rigidly connected together by a slotted cross-bar 36, which carries guide members 38 and 39, having sliding engagement, respectively, with the inner faces 40 and 41 of bars 42 and 43, which latter form part of the framework of the machine. This construction, as will be seen, causes the two crossheads 32 and 33 to move together longitudinally of rods 34 and 35 as they are caused to reciprocate by oscillation of rocker arms 26 and 27 through the mechanism and connections described above.

Clamped to cross-bar 36, but adjustable longitudinally thereof, are head blocks 46, in which are adjustably clamped the ends of trigger bars 47. It will thus be seen that as cross-bar 36 (see Fig. 4) is reciprocated with the crossheads 32 and 33, a corresponding reciprocation is given to the trigger bars 47 for a purpose to be more fully hereinafter set forth. These trigger bars are shown (see Figs. 10, 11, 13 and 15a) as being U-shape in cross-section, but any other shape permitting triggers to be pivotally mounted thereon may be used if desired.

Positioned at suitably spaced intervals along trigger bars 47 are triggers 48 pivotally supported upon pins 48a carried by the trigger bars. Referring to Fig. 5 it will be seen that these triggers 48 are so spaced along the trigger bars that the triggers will be properly positioned to push a set of strips or a piece or pieces of sheet material from the respective hoppers at the proper time. As seen in Fig. 5, the strip hoppers are designated as 49, while the sheet material is carried in hoppers 50 and 51.

Referring to Figs. 10, 11 and 12, the trigger bars 47 reciprocate longitudinally in the supporting guideways 52.

Secured to the upper faces of the trigger bar guideways 52 are the stock guideways 53 which serve to guide the strips and the sheet material. The inner edges of each pair of guideways 53 are spaced apart, a distance sufficient to form a longitudinal slot through which the triggers 48 protrude upward so as to be able to engage the strips and sheet material. It will be seen that the trigger bars may reciprocate back and forward in this longitudinal opening made up of the trigger bar guideways 52 and the stock guideways 53. These guideways 53 are provided with vertical protruding flanges 53a and 53b. The flanges 53a act to guide the strips and support the sheet material while the flanges 53b guide the sheet material as well as the outside strips as same are propelled through the machine.

The upper edge or toe of each of triggers 48 protrudes through its slot 54 a distance sufficient to engage the edge of one (but not two) strip or sheet at the bottom of the particular hopper being operated on. The triggers as shown are normally held with the toe in uppermost position by springs.

The trigger bar guideways 52 support the strip and sheet material guideways as well as the strips and sheet material hoppers, and said guideways 52 are clamped to the crossbeams 55 which form a part of the frame 1. The trigger bar guideways 52 on which are mounted the material guideways 53 are adjustable laterally on the crossbeams 55 so that within certain limits, I am able to have any desired distance between the various strips, as well as any length of sheet material in this direction. The strip and cleat hoppers 49, 130, 131 and 134 (see Figs. 5, 10, 11, 12, 20, 23 and 26) and the sheet material hoppers 50 and 51 (see Figs. 5, 13, 13a, 13b, 15a and 27) are adjustable longitudinally along the stock guideways 53, thus providing means for making variable length container walls and panels.

The operation of the trigger bars and triggers will be best understood from an inspection of Figs. 5 and 6, Fig. 6 showing a diagrammatic plan view of the strips 56 and sheets 57—58 in the various positions corresponding to those shown in Fig. 5. Assuming the trigger bars 47 to be in their extreme position to the left (in Fig. 5), and just ready to move to the right, as the trigger bars are moved to the right the left hand set of triggers 48, designated A (one under each of the three piles of strips in the three strip hoppers), move to the right and the upstanding toe of each of these triggers (arranged laterally in line with each other), due to each toe being forced upwardly to its uppermost position by spring S will engage the lower strip in its respective hopper and push the same to the right as far as the trigger bar moves. This will result in three strips in lateral alinement being positioned under sheet hopper 50, as shown in Fig. 5.

As the strips pass from their respective hoppers 49 they are propelled under glue applying rollers 69 (to be later described more fully).

Under action of the cross-bar 36 the trigger bars and triggers will then return to their extreme position to the left, which will return triggers A into position to push another set of three strips to the right upon the next movement of the trigger bars in that direction.

It will be seen that the strip hoppers 49 straddle the guideways 53 which guideways are provided with vertically extending flanges 53a and 53b, which flanges act as guideways for the strips. As the bottom strips are pushed from the various strip hoppers they are retained in between the vertical flanges of these guideways 53.

Means, which will be later explained in detail, are provided for holding the strips down in the bottom of these trough like guideways, while the sheet material rests above the strips (and not touching same until a determined time) and the vertically extending flanges 53a of the guideways 53 (see Figs. 13 and 15a). These vertically extending flanges upon which the sheet material is supported are all the same height. The two outside flanges 53b are sufficiently high to act as guideways for the sheet material.

The return movement of the trigger bars to the left also causes the next set of triggers to the right (designated B in Fig. 5) to pass to the left under strips 56 positioned below hopper 50. This is made possible by reason of the upper beveled faces of the triggers engaging the underface of the strips as the triggers move to the left and rotating the triggers about their fulcrum, which is accompanied by depression of spring S as shown in Fig. 15. As soon as the trigger clears the left end of the strip its toe will be forced upwardly by spring S into position for pushing strips and sheet material to the right upon the next movement of the trigger bars in that direction. This depression of the toe of the trigger and its return to upright position under action of spring S applies to each and all of the triggers that have to pass under strips or sheets when returning to starting position. Triggers A will merely propel strips without sheet material.

Upon the next movement of the trigger bars to the right triggers B will advance the three strips immediately in front thereof to the right, and due to the fact that triggers B extend sufficiently above strips 56 to pick up one (but not two) sheet 57 from hopper 50 they will at the same time carry one sheet forward with the three strips, said sheet being spaced vertically from the strips, and said sheet and strips being held in alinement at their rear edges by the triggers.

The three strips with a sheet properly positioned thereabove will now be in the third position from the left in Figs. 5 and 6, the various positions being consecutively numbered from the left in Fig. 6, by numbers in parenthesis. Upon movement of the strips and one sheet into position No. 3 the set of triggers designated C will upon return of the trigger bars to the left pass under the strips, as described above, to the position shown in Fig. 5, ready to advance the strips and sheet forward. Upon the next advance movement of the trigger bars the strips and one sheet will be carried by triggers C from position 3 to position 4. While this was taking place the set of triggers D was simultaneously carrying a sheet 58 into position No. 5, which is a step ahead of position 4. The triggers will move backwardly after each forward movement, in order to return to proper position for again advancing either strips or sheets, as the case may be.

Upon the next forward movement the set of triggers E will advance the strips 56 and sheet 57 from position 4 to position 6, picking up sheet 58 as they pass through position 5, sheet 57 pushing sheet 58 forward when they come into abutting relation. Up to this point sheets 57 and 58 have been sliding along on top of the vertical flanges 53a of the guideways 53 and spaced above the upper face of strips 56, for reasons to be later pointed out. In order to raise the strips into engagement with sheets 57 and 58 and bring the glue (which was deposited in spaced ribbons upon the strips when they passed under glue roll 69, see Figs. 5, 17, 18 and 19, as more fully hereinafter explained) on the strips into intimate contact with the sheets, I have provided a cam surface 70, (see Fig. 5), on each of the surfaces on which the strips slide (adjacent position 5) so that when the strips and sheets are brought into assembled relation the strips will move up along this cam surface and thus be brought into pressing engagement with the superimposed sheets, which are held down by the resiliently mounted pressure bars 71 (see Fig. 1) under which they pass. When the assembled strips and sheets are brought into position 6 the sheets, if desired, are further secured to the strips by staples driven by the stapling mechanism 16 (see Figs. 1 and 2) of any suitable type. Other forms of fastening devices than staples may be used if desired, or the strips and sheet material may not be attached with fastening elements, but may be held in guideways and carried on, below or between compression belts until the adhesive has sufficiently set. After being stapled or otherwise fastened the shipping container wall is pushed from the delivery end of the machine by the next oncoming unit. The container walls as they come from the machine may be carried along between compression elements, belts or chains until the glue is sufficiently set; or they may be placed in a press for a desired length of time; or I may simply rely on the fastening devices to clamp the glued surfaces together; or in some instances I may rely entirely upon the attaching means without an adhesive, or upon the adhesive alone.

As the sheet material and strips are propelled along the guideways 53 which guide the material between flanges 53a and 53b there is a tolerance between the flanges to permit the strips and sheet material to move freely, but shortly after they pass the cam 70, they enter other guideways 60 (see Fig. 2) which are under the stapling mechanism, which guideways bring the various strips and sheet material into a commercially exact predetermined relationship to each other. Inserted between the vertical guideways 60 are the clincher bars 37. These bars 37 serve a double purpose. They are used to clinch or bend over the points of the staples, nails or the like, when it is desired to clinch or rivet the attaching elements. These relatively short lengths are made of hardened steel to withstand the clinching of the attaching elements rather than have the bottom of the long guideways 53 made of the same expensive material. Their more important function, however, is to serve the purpose of economically being able to use the same machine and mechanisms for various thicknesses of strips. It will be seen that these relatively short lengths of clincher bars (and thereby relatively inexpensive) may be taken out and others inserted to accommodate strips of various thicknesses.

In Fig. 5 I have shown the trigger D supported in the same trigger bar with triggers A, B, C and E. This is satisfactory so long as the lengths of the strips 56 are such as to let triggers D rise to an upright position. When the strips 56 are too long to permit the proper functioning of triggers D, then I provide additional trigger bars in between the regular trigger bars upon which are mounted the triggers D (see Figs. 13a and 13b).

When the sheet material is of wood or veneer, or the like, it is generally much cheaper and usually necessary that the sheet material be made up of more than one piece. I have provided new and novel automatic means whereby the various sheets may be fed from hoppers and assembled in their proper relation to the strips. I have previously described the functioning of the trigger bars and told how the various triggers function to carry the strips 56 from their hoppers and the sheets 57 and 58 from their respective hoppers. By referring to Figs. 13a and 13b, it will be seen how the secondary sheets 58 are supported in their hoppers and means are provided for pushing the strips 56 and sheet 57 under the hopper, together with means for pushing the bottom sheet 58 out of its hopper and bringing it to a fixed point so as to later match up with the sheet 57 and strips 56. It would be commercially impractical to have the bottom sheets 58 in hoppers 51 resting on the top of flange 53a on the same plane with sheet 57 and then rely on sheet 57 pushing the sheet 58 out of the hopper. The sheets are not all exactly the same thickness and all do not lie sufficiently flat to permit of this practice so I have provided means to permit the sheet 57 to pass under the sheets 58 and the supplemental triggers D for getting the sheets 58 out of the hopper.

The sheets 58 in hopper 51 are supported from below by the horizontally extending flanges 53e and the angle shaped supports 120 (see Fig. 13a). The flanges 53e are attached to the flanges 53b. The angle shaped supports 120 are adjustable longitudinally along the supporting bar 121 which is provided with slot 122. The supporting bar 121 is attached to back side of hoppers 51. The angle supports 120 are clamped into the slot 122 and are adjustable longitudinally therein.

Fig. 13a shows how the angle supports 120 support the sheet material 58. It also shows the trigger C passing under the sheet material 58 and carrying before it strip 56 and sheet 57. It shows the position of trigger D as having carried the sheet 58 from the hopper 51. As trigger D pushed the sheet 58 from the hopper the front edge of sheet 58 came in contact with the beveled edge of the resilient acting pressure bar 71 and was forced down to the same level as the plane in which sheet 57 travels so that on the next forward movement of the trigger bars the front edge of sheet 57 will be brought to abut against the back edge of sheet 58 and then the strips 56 and the sheets 57 and 58 will be pushed forward in their proper alignment with each other.

The drawings show only two sheet hoppers but more hoppers could be provided and the same principle employed so that three or more sheets could be assembled from hoppers to strips 56.

After the strips pass under the glue roller 69 they have glue applied to their upper faces, hence means are provided to prevent this glue from being scraped off as they pass under the sheet material. Each strip is guided in a trough like guideway formed by the vertical flanges 53a and 53b of guideways 53. The strips are held down in these guideways while the sheet material is held above same on the vertical flanges 53a. Figs. 13, 14 and 15 show one means of holding these strips down by means of pawls 63, while Fig. 15a shows another means of holding the strips down with pressure bars 61 which straddle the flanges 53a. It is also essential that the strips be prevented from moving backwards as the triggers pass under them on the return trip of the trigger bars. These pawls 63 or the pressure bars 61 or both together may be used for the double purpose of preventing the strips from moving upwards or backwards.

The means shown in Fig. 13 for holding the strips down comprises an outwardly and downwardly inclined face 62 formed on the adjacent inner sides of the locking pawls 63, which inclined faces contact with the upper edges of the strips and hold them down, as will be clearly apparent in Figs. 13 and 14. In addition to preventing upward displacement of strips 56 as the triggers pass rearwardly thereunder, it is also necessary to provide means which at the same time will hold the strips against rearward movement. This is provided for by forming the front edges 64 of pawls 63 on an acute angle, which results in these edges biting into the wooden strips 56 and holding them against rearward movement, as shown in Fig. 14.

The pressure bars 61 (see Fig. 15a) straddle the vertically extending flanges 53a. The inner edges of the pressure bars rest on the outside edges of the strips and hold them down with sufficient pressure to prevent either upward or backward movement of the strips as the triggers pass under same. The sheet material 57 rests on the upper faces of the pressure bars 61. The glue is applied to the strips in ribbon like form. One of the reasons for doing this is to keep the glue away from the outside edges of the strips so that these pressure bars will not come in contact with the glue as the strip passes under same. Other reasons for applying the glue in ribbon like lines will be later explained.

A glue roll 69, shown diagrammatically in Fig. 5, spreads spaced ribbons of glue upon the upper surface of the strips as they are pushed from the strip hoppers 49. These glue bearing surfaces do not touch the underneath faces of the sheets (if there is more than one sheet per set of strips or cleats) until the strips reach the cam surfaces 70 adjacent position 6. While I have described the making of a container wall having three strips, it will be understood that any other number of strips may be used as desired.

Referring to Figs. 17, 18, 19 and 19a the glue roller 69 is mounted on shaft 75 which has its bearings in side walls 73 and 74. Fixed to one end of shaft 75 outside of wall 73 is a gear wheel 76, which is driven by a gear wheel 77 fixed to drive shaft 78 (see Fig. 16) which in turn is driven by a belt 79 from any suitable source of power, or by any other driving means desired. The glue is held in chamber 80 of the glue applying device (see Fig. 17) and in order that the glue in chamber 80 may be maintained in a fresh and usable condition a glue circulating system (see Fig. 16) is provided comprising a glue reservoir 81, from the bottom of which extends a pipe 82 connected with a circulating pump 83. Positioned above the glue rolls is a glue-distributing manifold 84, which is connected to the delivery side of the pump by means of piping 85. The manifold 84 is provided with a suitable number of outlets along the bottom side, those in use being connected by piping 86 (which may be flexible hose or not as desired) to glue chamber 80 of the glue applying device, and those manifold outlets not in use being closed by threaded plugs 87. One end of manifold 84 is connected back to the glue reservoir 81 by means of piping 88.

To further assist the maintenance of fresh glue in glue chamber 80, the glue chamber 80 is provided with an outlet 89 at a desirable height, which outlet is connected by piping, tubing, or the like, with return manifold 90, which in turn is connected back to the glue reservoir 81. It will thus be seen that a glue circulation is provided that will enable the glue roll to at all times have a supply of fresh glue. Manifold 84 may be supported by hangers 91, or by any other suitable means.

Referring to Fig. 18, the strips 56 pass under the glue roll 69 in guideways formed by the vertical flanges 53a being pushed thereunder by the triggers. The glue roller casing is mounted for vertical movement with relation to the bed upon which the strip slides. This movement is provided to accommodate strips of variable thickness and to insure a positive contact of the glue roll with the upper face of the strip. To permit this vertical movement of the glue roll casing in a controlled manner, a spring 93 is provided between each of the casings and a cross-bar 94 (see Fig. 16) extending across the tops of the casings. These springs hold the casings down in a yielding manner, permitting them to rise when necessary to accommodate a variation in the thickness of a strip. The cross-bar 94 is held at its ends by vertical anchor members 95, which in turn are secured to the frame of the machine.

Referring to Figs. 17, 18, 19 and 19a, the glue roll 69 is formed on its circumferential face with a pair of spaced grooves 96, which apply the glue in the form of two spaced ribbons on the strips. Between the grooves 96 is another groove 97 (see Fig. 19), through which the upper part of the trigger passes as it pushes the strip under the glue roller (thus preventing glue from getting on the triggers). Separating the above mentioned three grooves are the four flanges 105.

The glue reservoir 80 (see Fig. 17) which is a part of the glue-applying device is formed by the side walls 73 and 74 which meet to form the back wall 72 (see Figs. 17 and 18). To prevent the glue from getting down along the sides of the spreader roll 69 are the adjustable circular guide plates 73a and 74a which are recessed into the side walls 73 and 74 and extend from the top of the roll 69 to the bottom wall of the reservoir, which bottom wall is made up of the adjustable scraper plate 99.

The scraper plate 99 is held in the frame of the glue-applying device, and is adjustable to and from the circumferential face of the glue roller 69 by means of a screw passing through the lug 101 formed as a part of plate 99, and in threaded engagement with the threads formed in opening 102 of glue roller frame. The front face of the scraper plate 99 which comes in sliding contact with the circumferential face of the glue roller 69 is so shaped that it scrapes the glue off the circumferential face of the roll across the four flanges 105 and from within groove 97, the latter being effected by a projection formed on the forward end of plate 99 to substantially fit groove 97. Plate 99 is cut back to form recesses where it crosses the glue pockets 96 (see Fig. 19a). The amount of glue picked up in the grooves 96 as the roll passes from the reservoir 80, is regulated by the plate 107, which is directly above plate 99, and slides thereon. The front face of plate 107 has projections of approximately the same width as the width of the grooves 96 in roll 69. It will be seen from Fig. 19a that the longitudinal movement of plate 107 in or out from the circumferential face of roll 69 decreases or increases the size of the opening through which the glue is permitted to leave the glue reservoir. The moving in and out of the plate 107 in order to get the proper amount of glue in the glue grooves 96 is accomplished as follows:—Referring to Fig. 17, the flat spring 109 tends to push in the plate 107, but is prevented from doing so by the cam 108 which is mounted on lever 110. The cam 108 is mounted on the end of a shaft, which shaft is supported by bearings which are fastened to the frame 72. The screw 111 is threaded through the lever 110 with its front end abutting against the frame 72. As the screw is turned one way, the plate 107 moves in to decrease the size of the glue pocket and when turned in the opposite direction, the plate 107 moves out thereby increasing the size of the glue pocket.

The wiping pad 103, which is made of felt, leather or the like, bears resiliently, by virtue of the springy nature of its supporting strip 104, against the outer face of the glue roller 69, thus wiping any old glue therefrom, as same passes through the glue reservoir 80. Supporting strip 104 is secured to anchor rod 106.

Another novel feature relating to my feeding of strips under a glue spreading roller is the provision of means whereby the end of the strip will not pick up a surplus amount of glue as it starts under the glue spreading roller. Fig. 17 discloses how I accomplished this by having the bottom of the guideway sufficiently low as the strip approached and passed under the center of the glue spreading roller 69 so that it does not touch the glue. Just beyond the center of the glue spreading roll there is an incline 98 in the bottom of guideway 53 which raises the strip so that it does come in contact with the roll just as soon as the end of the strip passes this incline. This prevents the glue from piling up on the front end of the strip. The distance from the vertical center line of the roll to the incline 98 in the bottom of the guideway determines how close to the end of the strip the glue line starts. The ideal distance is such that when the box section or blank is later put under pressure the glue does not squeeze out at the end of the strip by an objectionable amount.

The previous descriptions relate to the functioning of the machine when making box sections or box blanks which are made up of parallel strips to which is attached sheet material. The following description shows that with slight modification this same machine may be used to assemble a panel or box end which is made with four wood cleats (which cleats form a rectangle) to which is attached sheet material.

To change the machine so as to produce panels it is only necessary to make the following changes (see Figs. 20 to 32).

1. The strip hoppers 49 are replaced by the cleat hoppers 130, 131 and 134 shown in Figs. 20, 23, 24, 25 and 26.
2. The material guideways 53 are replaced by guideways 53c and 53d shown in Figs. 23, 24, 25, 26 and 27.
3. The glue roller 69 takes a different form as shown in Fig. 31.
4. The stapling mechanisms 16 are replaced with other stapling mechanisms on cross-beam 15 for placing the staples in their proper location.
5. The pressure bars 71 take the form of pressure bar 71a shown in Fig. 20.
6. Different triggers of the proper height, F, G, H and K (see Fig. 20) are inserted in trigger bars 47 to replace the respective triggers A, B, C, D and E shown in Fig. 5.

The preferred form of cleats are shown in Figs. 21, 22, 23, 24, 25, 28, 29 and 30 and 32. The top and bottom cleats shown in Figs. 23, 24 and 25 are different from the top and bottom cleats shown in the other drawings, in that they have notches to receive the reinforcing strips of the box sections.

The top and bottom cleats are numbered 125 and 125a, and the side cleats are numbered 126 and 126a. I do not limit my invention to this form of cleat construction, as it will be clear from the drawings and description that other forms of cleats could also be assembled by this same new and novel method.

Referring to Figs. 21, 22 and 32, the panel is made up of top and bottom cleats 125 and 125a, and the two side cleats 126 and 126a. Sheet material 127 is secured to the cleats by suitable attaching means 128 (shown as staples, although other attaching means such as nails or the like may be used). The preferred form of panel has glue between the cleats and the sheet material, as shown in Fig. 32, with the glue applied to the cleats in the preferred ribbon like lines 129.

Fig. 20 is a view similar to Fig. 5, but shows the functions of the various triggers as they assemble the cleats and sheet material to form a panel instead of the box section or blank formed in Fig. 5.

Referring to Figs. 20, 23, 24 and 25, it will be seen that the trigger bars 47 reciprocate between the two guideway members 52 (see Figs. 26 and 27). The triggers F, G, H and K protrude upwardly through the slot between the guideways 53c and 53d. On the forward movement of the trigger bars the first trigger F in each feed bar comes in contact with the side cleat 126 sustained by hoppers 130 and push cleat 126 forward. Cleat 126 is on a lower level than cleats 125 and 125a (Fig. 25), so that when cleat 126 starts to push cleats 125 and 125a out of their respective hoppers there is no possibility of cleat 126 disturbing the next layer of cleats just above which are held in hoppers 131. Hoppers 131 (see Fig. 25) are cut away at the bottom to permit cleat 126 to pass. Cleat 126 is so held in the hopper with respect to cleats 125 and 125a (Figs. 23 and 28) that as it goes forward the edges of its shoulders will clear the inside faces of the cleats 125 and 125a. As the cleat 126 moves forward it comes in contact with and pushes before it cleats 125 and 125a. As cleat 126 pushes cleats 125 and 125a forward they are guided on their outside edges by the upright flanges 53b on the guideways 53c (Fig. 26) and on their inside by the shoulders of cleat 126. After cleat 126 has pushed cleats 125 and 125a forward a short distance it is raised to the same level as cleats 125 and 125a by means of an incline 132 (see Figs. 23 and 25) in guideways 53c and 53d. While cleat 126 has been pushing cleats 125 and 125a forward they have engaged with cleat 126a and been pushing it forward (see Fig. 24). Cleat 126a is on a higher level than cleats 125 and 125a (for the same reason that cleat 126 is on a lower level than cleats 125 and 125a) so that after they have engaged with cleat 126a they are raised to the same level as cleat 126a, by means of the inclines 133 in the bottom of guideways 53c and 53d.

Cleat hoppers 134 hold cleats 126a so that the cleats 125 and 125a will engage a cleat 126a without striking the shoulders on each of its ends. Shortly after cleats 125 and 125a have engaged with cleat 126a, they strike the bevels 135 in the sidewalls of the guideways 53b, which bring the inside faces of cleats 125 and 125a to rest against the shoulders of the notched ends of cleats 126a.

It will follow from the above description that as cleat 126 meets the inclines 133 it will also be brought up to the same level as cleat 126a, and as cleat 126 approaches the bevels 135 that the two shoulders on its notched ends will be brought to abut against the inside faces of cleats 125 and 125a.

The above description describes how the four rectangular cleats are automatically fed from rectangular hoppers and brought out to form a rectangular frame with each cleat in its proper relation to each other.

From this point on the operation is practically the same as described in making sections or blanks with strips and sheet material.

The triggers by means of their step by step functioning first carry the cleats from the hoppers and bring them together in their approximate predetermined relation to each other as described above, then the triggers continue to propel the cleat frame under a glue spreading roller (Fig. 31) similar in general construction to that shown in Fig. 17, but having a larger number of glue carrying grooves. Then the cleat frame is further propelled under one or more sheet material hoppers, the cleats and sheets being finally brought in a definite relationship to each other to an attaching mechanism which binds the sheet material to the rectangular framework of cleats.

Referring to Fig. 20, trigger F carries the cleats from the hoppers and pushes them under the glue roller; trigger G picks up the bottom sheet from hopper 50 and pushes it (together with the cleat frame) one step forward; trigger H pushes the cleat frame and the sheet material another step forward, and trigger K (which corresponds to trigger E in Fig. 5) pushes the assembled panel with its various parts in proper relation to each other under the attaching mechanism.

In Fig. 27 I show the cleat frame being pushed by triggers G under the sheet hopper 50, and how the triggers act to push before them the cleat frame and the bottom piece of sheet material. The sheet material 127 is supported above the cleats by the horizontal flanges 53c which protrude from the vertical flanges 53b. When only one piece of sheet material is required per panel this horizontal flange need not extend past the hopper 50, but if more than one piece of sheet material per panel is used it is to extend up to the bevel 70 in the guideways 53. Where only one piece of sheet material per panel is used it is not necessary to have a bevel 70 in the guideways.

I particularly prefer the use of my novel reciprocating feed bars with triggers, because they can be easily and accurately adjusted to bring the stock through the guideways up to the attaching mechanism in proper alignment. While new chains can be adjusted to do the work accurately it is only a short time before one chain becomes longer than another one due to the unequal wear of the many links, with the result that the lugs on the chains which propel the strips and sheet material do not line up properly to bring the strips and sheet material to the attaching mechanism in an accurate manner. However, endless chains with a step by step movement provided with lugs on same could be substituted for the trigger bars by having the lugs on the chains all the same height, and provide cam like means on the guideways for raising the chain as it passed under certain hoppers. If the sheet material is laid on by hand instead of being fed from hoppers, the lugs on the chains could all be the same height, and it would not be necessary to provide cam like means in the guideways for raising the chain.

It would not depart from my invention if I chose to have the sheet material fed under the strip hoppers instead of feeding the strips under the sheet material hoppers, as described. In this event I would first have the sheet material pass under a glue roller which would apply glue to the upper faces of the sheet material at the places where the strips are to be attached, and the sheet material would then pass under the strip hoppers, and the various strips would be pushed from the bottom of the hoppers and rest on the sheet material. The strips would be held in proper alignment by means of guideways which would either rest upon or be supported directly above the sheet material.

Having now described my invention, what I claim is:

1. The method of making shipping container walls which consists in providing two laterally spaced longitudinal stacks of strips, cleats, or the like, two longitudinally spaced transverse stacks of strips, cleats, or the like, each of the latter strips, cleats, or the like, having a recess at each end, moving one of said latter strips, cleats, or the like, laterally to push two of the longitudinal pieces forward to push one of the other of said transverse pieces from under its stack, moving each of the two longitudinal pieces inwardly to force each of their ends into the respective adjacent recess of the transverse pieces, applying adhesive to said four assembled pieces, and applying sheet material thereover firmly held against said adhesive.

2. The method of making shipping container walls which consists in feeding from hoppers four strips, cleats, or the like, moving two of said pieces inwardly to bring their ends snugly into abutting relation with the other two pieces, applying adhesive to said assembled pieces, and then applying sheet material thereover firmly in contact with said adhesive.

3. The method of making shipping container walls which consists in feeding from hoppers, or the like, four strips, cleats, or the like, propelling said pieces forward in a manner to form a rectangular frame, applying adhesive to one face of said frame, and then applying sheet material to said frame in contact with said adhesive.

4. The method of making shipping container walls which consists in propelling a plurality of strips, cleats, or the like, from one set of hoppers to a position beneath a sheet hopper, then propelling said strips, cleats, or the like, and a sheet forward and bringing said sheet into abutting edgewise relation with a second sheet, and securing said sheets to said strips, cleats, or the like.

5. The method of making shipping container walls which consists in providing hoppers for strips, cleats, or the like, glue applying means, one or more sheet hoppers, guideways and reciprocating trigger bars having propelling triggers, propelling strips, cleats, or the like, by means of triggers from the strip hoppers into glue applying contact with said glue applying means and then into position beneath a sheet hopper, the first set of triggers then returning for other strips, cleats, or the like, and a second set of triggers propelling the first mentioned strips, cleats, or the like, and a sheet or sheets from the sheet hopper forward, then other triggers propelling the parts forward to assembling and fastening positions.

6. The method of making shipping container walls which consists in feeding from hoppers cleats in spaced relation, bringing the ends of said cleats into proper assembled relation as the cleats are fed forward, feeding sheet material forward in vertical spaced relation to said assembled cleats, bringing said sheet material into contact with the cleats and fastening it thereto with an adhesive therebetween.

7. Apparatus for making shipping container walls composed of strips, cleats, or the like, and sheet material, comprising means for fastening the strips, cleats, or the like, and sheet material together with adhesive, a fixed work holder, means for propelling and guiding the parts into said work holder, and means for fastening the parts together while being held in predetermined relationship in said work holder.

8. Apparatus for making shipping container walls, comprising means for holding in place one or more stacks of strips, cleats, or the like, adhesive applying means, means for holding in place a stack of sheet material, means for feeding one strip, cleat, or the like, from each stack thereof, means for guiding the last mentioned strip, cleat, or the like, to said adhesive applying means, whereby adhesive is applied to the surface of each strip, cleat, or the like, so fed, and means for propelling the latter under the stack of sheet material and bringing one layer from the stack of sheets and the said strips, cleats, or the like, together in predetermined relation.

9. Apparatus for making shipping container walls, comprising elongated guideways, hoppers for strips, cleats, or the like, and one or more sheet material hoppers on said guideways, reciprocating feed bars each having a plurality of feeding fingers, means for operating said bars and fingers to feed one strip, cleat, or the like, from each strip hopper and one layer of sheet material from said sheet material hopper, and propel them forward in said guideways and bring them into assembled relation, and means for fastening together the assembled parts, and means for applying adhesive to said strips, cleats, or the like, before they are brought into assembled relation with said sheet material.

10. Apparatus of the class described comprising guideways, hoppers for strips, cleats, or the like, a sheet material hopper, means for ejecting from said strip hoppers and propelling along said guideways a set of laterally spaced strips, cleats, or the like, means for ejecting from said sheet material hopper and propelling along said guideways a layer of sheet material, said guideways being formed at one portion of their length as a work holder into which the parts are brought in predetermined assembled relation, and means for applying adhesive between the strips, cleats, or the like, and sheet material prior to their being brought together in said work holder.

11. Apparatus of the class described comprising guideways, hoppers for strips, cleats, or the like, a sheet material hopper, means for ejecting from said strip hoppers and propelling along said guideways a set of laterally spaced strips, cleats, or the like, means for ejecting from said sheet material hopper and propelling along said guideways a layer of sheet material, said guideways being formed at one portion of their length as a work holder into which the parts are brought in predetermined assembled relation, and means for applying adhesive between the strips, cleats, or the like, and sheet material prior to their being brought together in said work holder, and means for fastening together the assembled parts with staples, nails, or the like.

12. In apparatus of the class described, four cleat hoppers, means for feeding cleats from said hoppers, means for moving said cleats to bring their ends into proper relationship as they are being moved forward, a sheet material hopper, means for feeding a layer of sheet material from its hopper, means for bringing said assembled cleats and sheet material into predetermined assembled relation, and means for fastening the sheet material and cleats together.

13. Apparatus for making shipping container panels, comprising means for feeding four cleats, means for assembling said cleats into a rectangular frame, means for feeding sheet material, means for bringing said frame and sheet material into predetermined assembled relation, and means for fastening the sheet material to the frame.

14. Apparatus for making shipping container panels, comprising means for feeding four cleats, means for assembling said cleats into a rectangular frame, means for feeding sheet material, means for bringing said frame and sheet material into predetermined assembled relation, and means for fastening the sheet material to the frame, and means for applying adhesive between the sheet material and frame.

15. In apparatus for making shipping container walls, guideways, a plurality of hoppers on said guideways, adhesive applying means on said guideways, trigger bars mounted for reciprocation on said guideways, triggers pivotally mounted on said bars and arranged to push material from said hoppers forward in the guideways on one movement and be depressed and pass under said material on the reverse movement, means for maintaining one part of the material spaced from another as they move along the guideways, and means for bringing said spaced parts firmly together with adhesive therebetween.

16. In apparatus for making shipping container walls, guideways, a plurality of hoppers on said guideways, adhesive applying means on said guideways, trigger bars mounted for reciprocation on said guideways, triggers pivotally mounted on said bars and arranged to push material from said hoppers forward in the guideways on one movement and be depressed and pass under said material on the reverse movement, means for maintaining one part of the material spaced from another as they move along the guideways, and means for bringing said spaced parts firmly together with adhesive therebetween, and means for fastening said parts together with staples, nails, or the like.

17. In apparatus for making shipping container walls, guideways, hoppers for strips, cleats, or the like, sheet hoppers, means for propelling forward strips, cleats, or the like, and sheet material, along said guideways, and means for holding said strips, cleats, or the like, and sheet material, against backward movement in said guideways.

18. In apparatus for making shipping container walls, guideways, hoppers for material such as strips, cleats, or the like, and sheets, trigger bars, means for reciprocating said trigger bars, and triggers pivotally mounted on said trigger bars, said triggers being normally resiliently held in vertically extended position to propel said material forward on forward movement of the trigger bars and be depressed and pass rearwardly under said material upon rearward movement of the trigger bars, and means on said guideways for applying an adhesive to one or more parts of said material, said guideways having means for bringing said sheets and strips, cleats, or the like, firmly together.

19. In apparatus of the class described, guideways, hoppers for strips, cleats, or the like, means for ejecting the strips, cleats, or the like, from said hoppers and propelling them along the guideways, means on said guideways for holding said strips, cleats, or the like, against any substantial movement vertically for a portion of their length of travel in the guideways, a sheet hopper, means for propelling sheets forwardly along the guideways but vertically spaced from the strips, cleats, or the like, and means on said guideways for bringing said sheets and strips, cleats, or the like, into predetermined assembled relation.

20. In apparatus of the class described, a plurality of cleat hoppers arranged to hold two longitudinal cleats spaced laterally and two lateral cleats having notches and arranged one adjacent each end of the longitudinal cleats, means for pushing a lateral cleat from its hopper to cause it to push the two longitudinal cleats longitudinally, and to cause the other lateral cleat from its hopper, to push the other lateral cleat from its hopper, and means during such movements to cause the ends of the longitudinal cleats to firmly enter and be held in said notches.

21. In apparatus of the class described, a plurality of cleat hoppers arranged to hold two longitudinal cleats spaced laterally and two lateral cleats having notches and arranged one adjacent each end of the longitudinal cleats, means for pushing a lateral cleat from its hopper to cause it to push the two longitudinal cleats longitudinally, and to cause the longitudinal cleats to push the other lateral cleat from its hopper, and means during such movements to cause the ends of the longitudinal cleats to firmly abut with the lateral cleats, a sheet hopper, means for propelling a layer of sheet material from said sheet hopper, means for applying adhesive to one face of the assembled cleats, and means for bringing said assembled cleats and layer of sheet material into predetermined assembled relation.

22. The method of making shipping container panel walls having laterally and longitudinally disposed members, which consists in feeding the lateral and longitudinal members from hoppers in which the two lateral members are on different levels than the two longitudinal members, thereby permitting the first lateral member to push the two longitudinal members from their respective hoppers, without disturbing the next layer of longitudinal members just above same, and also permitting the two longitudinal members to push the second lateral member from its hoppers without disturbing the lateral member just above it.

23. The method of making shipping container walls which consists in propelling a plurality of strips, cleats, or the like, in guideways beneath a hopper containing sheet material, and further propelling said strips, cleats, or the like, together with the bottom sheet from said sheet material hopper, and bringing said first sheet into abutting edgewise relation with a second sheet and bringing the said strips, cleats, or the like, and the two sheets together into a work holder in a predetermined relationship to each other.

24. In box making machinery, a nailing machine, box parts supports projecting from under the machine, hoppers for the box parts above the supports, a reciprocating feeding structure, and means provided with said structure to successively engage and advance parts from the hoppers onto the supports in predetermined spaced relation to each other with successive reciprocations of the structure and arranged so that a further advancing stroke of the structure, after all the parts are on the supports, will advance the parts, in the same spaced order to a nailing position relative to the machine.

OLIVER M. BABCOCK.